United States Patent [19]

McClain

[11] 4,200,601
[45] Apr. 29, 1980

[54] PROCESS OF PREPARING FINELY DIVIDED POLYOLEFIN RESINS

[75] Inventor: Dorothee M. McClain, Cincinnati, Ohio

[73] Assignee: National Distillers and Chemical Corporation, New York, N.Y.

[21] Appl. No.: 934,645

[22] Filed: Aug. 17, 1978

[51] Int. Cl.$^2$ ............................................. B22D 23/08
[52] U.S. Cl. ............................... 264/9; 260/29.6 XA; 260/29.6 H; 528/486
[58] Field of Search ............................ 264/9; 528/486; 260/29.6 XA, 29.6 H

[56] References Cited

U.S. PATENT DOCUMENTS 3,586,654  6/1971  Lerman et al. ............................ 264/9

FOREIGN PATENT DOCUMENTS 631021  11/1961  Canada ........................................ 264/9

OTHER PUBLICATIONS

Detergents & Emulsifiers, McCutcheon's, 1972 Annual, pp. 46–47, Allured Pub. Corp., Ridgewood, N.J.

Primary Examiner—James H. Derrington
Attorney, Agent, or Firm—Kenneth D. Tremain

[57] ABSTRACT

Powders of polyolefin resins such as polyethylene homopolymer are obtained by agitating molten resin in admixture with water and in the presence of a dispersing amount of an alkali metal salt of an amino acid dispersant. The particle size distribution of the dispersed resin can, if desired, be regulated by the addition of base thereto.

11 Claims, No Drawings

PROCESS OF PREPARING FINELY DIVIDED POLYOLEFIN RESINS

BACKGROUND OF THE INVENTION

1. Field of the Invention

This invention belongs to the field of processes for providing thermoplastic resins in fine powder form and, more particularly, to such processes in which the powders are obtained from aqueous dispersions of resin.

2. Description of the Prior Art

Thermoplastic resins in finely-divided form have found use in a number of applications where it is either impossible or inconvenient to utilize the more conventional cube or pellet forms. For example, powdered organic polymeric thermoplastic resins in dry form have been used to coat articles by dip coating in either a static or fluidized bed, by powder coating wherein the powder is applied by spraying or dusting, and by flame spraying. In dispersed form, thermoplastic resin powders have been applied as coatings by roller coating, spray coating, slush coating, and dip coating to substrates such as metal, paper, paperboard, and the like. These powders have also been widely employed in conventional powder molding techniques. Other applications of these powders include paper pulp additives; mold release agents for rubber; additives to waxes, paints, and polishes; binders for non-woven fabrics; and so on.

It is well known that high molecular weight thermoplastic resins, for example, polyethylene and ethylene copolymers, may be converted to dispersions of spherically shaped particles which are substantially devoid of particles greater than 25 microns in diameter and in which the number average particle diameter is less than about 10 microns. Thus, McClain U.S. Pat. No. 3,422,049 teaches that such dispersions of finely divided particles may readily be prepared by agitating the molten resin in admixture with water at elevated temperatures and at autogeneous pressure, in the presence of certain dispersing agents which are particular block copolymers of ethylene oxide and propylene oxide. The non-agglomerated spherical particles can be recovered as powders by cooling the dispersions below about 100° C. and collecting the suspended material by filtration or centrifugation.

U.S. Pat. No. 3,418,265 further teaches that the particle size of such thermoplastic resin dispersions can be reduced still further, to the sub-micron level, while retaining the unique spherical particle shape by including in the dispersions process a volatile, inert, water-insoluble organic liquid that is soluble in the thermoplastic resin in an amount between 0.5 and 20 parts per 100 parts of the resin, whereupon a stable, aqueous, film-forming latex is ultimately obtained as the final product. Alternatively, U.S. Pat. No. 3,522,036 teaches that stable, film-forming aqueous latices of high molecular weight polyethylene can also be formed by including a liquid vinyl monomer such as styrene in the dispersion process.

Although the foregoing dispersion procedures are conveniently operated as batch processes, it is also known to produce such finely divided powders in a sequential, continuous dispersion process. See, e.g., U.S. Pat. No. 3,432,483.

U.S. Pat. No. 3,586,654 teaches that it is further possible to conduct the dispersion process in such a way that the polymer particles may be further transformed into spherical particles of controlled average size and size distributions which are the same, larger or smaller than the starting particles. If desired, the dispersion process can be modified in such a manner as to produce spherical foamed particles (U.S. Pat. No. 3,432,801), or to incorporate within the particles certain colorants (U.S. Pat. No. 3,449,291) and pigments (U.S. Pat. No. 3,674,736).

The fine powders are, by virtue of their small particle size, narrow particle size range, and spherical particle shape, unique states of matter which cannot readily be prepared by other conventional processes known in the art. The advantages and utility of such fine powders has been described in many of the aforesaid patent disclosures. In addition, it has been found that various substrates can be coated by applying the above described dispersions of polyolefin fine powders in an inert carrier, heating to evaporate the carrier, and fusing the polyolefin to the substrate (U.S. Pat. No. 3,432,339). Further, U.S. Pat. No. 3,669,922 teaches a process for preparing colored polymer powders having controlled charge and printing characteristics of value as toners in electrostatic printing.

SUMMARY OF THE INVENTION

In accordance with this invention a normally solid polyolefin resin is rapidly dispersed under conditions of rapid mixing in water heated to a temperature at or above the melting point of the resin, employing as dispersing agent, at least one alkali metal salt of an amino acid dispersant following cooling of the aqueous dispersion to a temperature which is below about 100° C., the resin is recovered therefrom as a finely divided powder. The use of alkali metal salts of amino acids as dispersing agents herein generally provides resin particles which are larger than those obtained by the use of the block copolymers of ethylene oxide and propylene oxide heretofore employed as dispersing agents and affords wider ranges of resin particle size than those attainable with the latter dispersants without, however, requiring the use of large amounts of dispersant. In addition, the dispersing agents herein substantially avoid the, at times, objectionable ultrafine (about 10 microns or less) resin particle fractions which can be produced by the aforementioned block copolymers of ethylene oxide and propylene oxide.

Briefly stated, the invention herein provides a process for preparing in a finely divided form a solid polyolefin resin which comprises:

(a) agitating a mixture of the resin while in the molten state, a dispersion-forming amount of water, and a dispersion-forming amount of an alkali metal salt of an amino acid dispersing agent, to provide an aqueous dispersion of the resin; and, (b) cooling the dispersion to provide solid particles of resin.

The cooled dispersion of resin powder can be directly employed in various applications or the resin powder can be recovered therefrom using known and conventional procedures such as filtration and centrifugation.

It is also within the scope of this invention to include small quantities of a base such as an alkali metal hydroxide in the dispersion process of paragraph (a) in order to regulate the particle size distribution of the dispersed particles. In this manner, individual lots of resin powders can be produced which have optimum particle size distributions for given applications.

DESCRIPTION OF THE PREFERRED EMBODIMENTS

In general, the polymers suitable for the practice of this invention include any normally solid, polyolefin resin whose decomposition point is somewhat higher than its melting point and somewhat less than the critical temperature of water.

The polyolefins most suitable for the practice of this invention include normally solid polymers of olefins, particularly mono-alpha-olefins, which comprise from two to about six carbon atoms, e.g., polyethylene, polypropylene, polybutene, polyisobutylene, poly (4-methylpentene), and the like. Preferred polyolefin feeds are polyethylene and polypropylene.

The polyolefin resin starting materials may also include copolymers of the olefin with minor amount, say up to about 25% by weight, of a variety of comonomers. Such copolymers include, for example, olefin-vinyl copolymers and olefin-allyl copolymers wherein the comonomer is present in minor amount.

Suitable olefin-vinyl copolymers include ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and ethylene-acrylic acid, ethylene-methacrylic acid and their salts.

Olefin-allyl copolymers include ethylene-allyl alcohol, ethylene-allyl acetate, ethylene-allyl acetone, ethylene-allyl benzene, ethylene-allyl ether, ethylene-acrolein, and the like.

Vinyl polymers suitable for use in this invention include polyvinyl chloride, polyvinyl fluoride, vinyl chloride/vinyl acetate copolymers, and polyvinylidene chloride and fluoride.

Preferred among the polyamides are linear superpolyamide resins, commonly referred to as nylons. Such polymers can be made by the intermolecular condensation of linear diamines containing from 6 to 10 carbon atoms with linear dicarboxylic acids containing from 2 to 10 carbon atoms. Equally well, the superpolyamides may be made from amide-forming derivatives of these monomers such as esters, acid chlorides, amine salts, etc. Also suitable are superpolyamides made by the intramolecular polymerization of omega-amino-acids containing 4 to 12 carbon atoms and of their amide-forming derivatives, particularly the internal lactams. Examples of specific nylons are polyhexamethylene adipamide, polyhexamethylene sebacamide, and polycaprolactam. Especially preferred are nylons having intrinsic viscosities ranging between 0.3 and 3.5 dl./g. determined in m-cresol.

Acrylic resins suitable for use in this invention include polymethyl methacrylate, polyacrylonitrile, polymethyl acrylate, polyethyl methacrylate, etc. Preferred is polymethyl methacrylate.

The term "amino acid derivative" as used herein covers a broad variety of surfactants derived from amino acids and polyamino acids (including proteinaceous materials) which are well known in the art. Included among the alkali metal salts of amino acid derivatives which can be employed in the process of this invention with good results are the alkali metal salts, preferably the sodium or potassium salts, and especially the sodium salts, of N-mono- or disubstituted mono- or polyamino acids and esters in which there can be present saturated or unsaturated aliphatic, alicyclic, aromatic, monocyclic, polycyclic, hetero cyclic, monocarboxylic and/or polycarboxylic moieties. The amino acid can also contain alkoxy, hydroxy and/or phosphate groups.

The preferred amino acid surfactants that fall within the scope of this invention are commonly known as amphoteric surfactants. In their free-acid form they may be represented by formula 1:

$$R-N \!\!-\!\!\stackrel{(H)_{2-m}}{\mid}\!\!-\![(CH_2)_n-COOH]_m \qquad (1)$$

where R is a linear or branched, saturated or mono-olefinically or diolefinically unsaturated alkyl group containing 8 to 22 carbon atoms; and n and m are 1 or 2. The R radicals may be the same in any given surfactant, but more commonly, especially in practical products of commerce, several different R groups will be present in varying proportions. The R radical stems from a primary amine, $RNH_2$, and is normally derived from natural fats and oils by such processes as saponification, hydrogenation and amination. Such R radical mixtures are often named in such a way as to indicate the natural oil from which they were obtained, e.g., R=coco; i.e., derived from coconut oil. Thereafter, the primary amines $RNH_2$ are converted to 1 (n=2) by acrylation, e.g., by cyanoethylation with acrylonitrile and hydrolysis or by reaction with a chloroacetic acid salt (n=1). Although the surfactants 1 are amphoteric, it is preferred in this invention to employ them in the form of their alkali metal salts (Na, K, etc.), obtained commercially or produced by careful neutralization in aqueous solution with an alkali metal hydroxide, bicarbonate or carbonates. Especially preferred as surfactants in the process of this invention are sodium and potassium salts of structure 1 where n=2, m=1 and 2 and R contains predominantly 12 to 18 carbon atoms. Examples of 1 are N-coco-3-aminopropionic acid, N-tallow-3-iminodipropionic acid, N-stearyl-3-aminopropionic acid, N-stearyl-3-iminodipropionic acid, N-lauryl-3-iminodipropionic acid.

Other less preferred amphoteric surfactants that fall within the scope of this invention may also be represented by structure 1, where R is an acyl group containing 8 to 22 carbon atoms, e.g., N-lauroyl 3-aminopropionic acid, N-stearoyl 3-iminodipropionic acid, etc. Still other amphoteric surfactants are exemplified by N-hydroxyethyl-N-lauramido-β-alanine and N-hydroxyethyl-N-stearamidoglycine; all of these materials being employed in the form of their alkali metal salts in the process of this invention.

A number of the aforesaid amino acid derivatives are commercially available: Deriphat 151, Deriphat 154 and Deriphat 160 (General Mills Chemicals, Inc.), respectively, the sodium salt of N-coco 3-aminopropionic acid, the disodium salt of N-tallow 3-iminodipropionic acid and the disodium salt of N-lauryl 3-iminodipropionic acid; Mafo 13 and Mafo 213 (Mazer Chemicals), respectively, the potassium salt of a complex N-stearyl amino acid and the dipotassium salt of a complex N-stearyl amino dicarboxylic acid; Armeen Z (Armak Co.), an N-coco aminobutyric acid; Lipoproteol UCO and Lipoproteol LCO (Rhodia, Inc.), both of which are salts of lipoaminoacids.

The dispersing agents of the present invention, by functioning effectively from temperatures as low as the melting point of low density polyethylene, i.e., about 115° C. up to as high as 325° C., are not limited to the dispersion of low molecular weight low density polyethylenes. For example, high molecular weight low density polyethylenes, linear polyethylene, polypropylene and copolymers containing up to about 25% of comonomers such as ethylene-vinyl acetate copolymers, ethylene-allyl alcohol copolymers, and the like can be readily dispersed by means of the subject novel dispersing agents to dispersions substantially devoid of particles larger than 500 microns and wherein the particles have a relatively narrow size range. Where it is desired to prepare the finest dispersion of a given polymer, the dispersion temperature should be such that the resin being dispersed exhibits a melt flow rate (ASTM D1238, hereinafter Condition E unless otherwise specified) of greater than 15, and more preferably, greater than 20. Where larger average particle sizes are desired or acceptable, however, dispersion temperatures may be employed, still in combination with only relatively mild agitation, at which the polymer exhibits a melt flow rate appreciably lower than 15, for example, as low as about 2.

The temperature of operation is dependent upon the melting point, melt flow properties, decomposition temperature, and desired fineness of dispersion of the selected synthetic organic thermoplastic resin. While such resins can be dispersed at temperatures commencing with their respective melting points, increases in dispersion temperature beyond the melting point and up to the decomposition of the resins are generally accompanied by corresponding increases in the fluidity of the molten resin. As the fluidity of the melt increases, the dispersions generally tend to develop lower average particle sizes without requiring increases in agitation effort.

The dispersing apparatus or device may be any device capable of delivering at least a moderate amount of shearing action under elevated temperatures and pressures to a liquid mixture. Suitable, for example, are conventional autoclaves equipped with conventional propeller stirrers. Propellers designed to impart greater shear to the mixture tend to improve the recovered yield of pulverulent polymer, but with little effect on the particle size and distribution of recovered polymer. The particle size and distribution are somewhat dependent on the stirring rate, higher stirring speeds resulting in finer and narrower dispersions until an optimum speed is reached above which there is little change. The overall recovery yield of pulverulent polyolefin from the dispersion is dependent upon the duration of stirring. For a given type and rate of stirring, a period of stirring exists within which maximum recoverable yields of pulverulent polyolefins result. Either shorter or longer periods of shearing result in lower recoverable yields. Preferred stirring periods generally will range from about 1 to 20 minutes, and preferably from about 5 to 15 minutes. It will be understood, however, that the stirring rates and periods will depend upon the type of equipment utilized. While the rate and duration of agitation affect particle size and distribution and recoverable yields of pulverulent polymer, these variables can be readily optimized for any given polyolefin through simple, routine experimentation.

In carrying out the subject process, the selected synthetic organic thermoplastic polymer is first contacted with water and the dispersing agent. It is a particularly advantageous feature of this invention that the dispersing agent need not be incorporated into the polymer prior to the introduction of the water by such means as milling and the like, but may be introduced into the dispersing apparatus simultaneously with the other ingredients or as a solution in the aqueous phase. If desired, the dispersion process may be operated in a continuous manner, in which case it is convenient to premix the desired ratio of dispersing agent, water, and polymer, and introduce this mixture continuously to the reactor while continuously removing from another part of the reactor the product dispersion.

The amount of water used in relation to the polymer dispersed generally ranges from about 0.1 to about 10.0 parts by weight of water per part of normally solid polymer. Higher ratios are operable but uneconomical whereas lower ratios, although usable, present operational difficulties. The preferred range is between about 0.2 and about 5.0 parts per part of polymer.

The amount of dispersing agent should be sufficient to provide a dispersion of the resin in the water under the selected conditions. Very good dispersions can be obtained at amounts within the range of from 2 to about 25 weight parts dispersing agent per 100 weight parts of resin and as such, these amounts are preferred. There is no upper limit on the amount of dispersing agent which can be employed except that exceeding the amount beyond that required to provide an acceptable dispersion may be economically wasteful.

As previously stated, a base can be included in the dispersion process to regulate the particle size distribution of the resin. The term "base" as employed herein refers to alkali metal hydroxides, e.g., sodium hydroxide and potassium hydroxide, and salts of alkali metals which in a 1.0 molar solution, exhibit a pH of about 11.0 or higher, e.g., sodium phosphate and sodium carbonate. Sodium hydroxide is especially preferred. The particle size-adjusting amount of base to be employed for a given resin can be readily determined by simple and routine experimentation. Even as small an amount as about 0.6 weight parts per 100 weight parts of resin will decrease the particle size. There also exists an optimum amount of base for minimum particle size, i.e., larger amounts of base added to the dispersion will again increase the particle size. The amount, of course, will vary with different dispersing agents. Generally the amount of base included in the process will vary from about 0.1 to about 6.0 weight parts per 100 weight parts of resin. Further, amounts of base above 6 weight parts per 100 weight parts of resin can be used but with care if the polymer is susceptible to reaction with base under the dispersing conditions used. Ordinarily, however, there is little advantage to be gained in using the larger amounts of base and such should generally be avoided as unnecessary and wasteful.

The temperature for forming the hot aqueous resin dispersion can range from about 100° C. to about 270° C. with temperatures of from about 150° C. to about 250° C. being preferred.

The pressure under which the present process is carried out is so adjusted to exceed the vapor pressure of water at the operating temperature so as to maintain a liquid water phase. More particularly, the pressures may range from about 1 to 217 atmospheres, and preferably from about 6 to 120 atmospheres. In cases where the polymer is sensitive to air at the elevated dispersion temperature, an inert gas, e.g., nitrogen or helium, may be substituted for the air normally present, and deaerated water used. When heat-sensitive polymers are to be dispersed, heat stabilizers in sufficient amounts are included in the dispersion process. Plasticizers, lubricants, anti-oxidants, and the like may also be included. Mixtures of polymers may also be dispersed.

The dispersions resulting from the above process are compositions comprising a dispersion of a normally solid synthetic organic polymeric thermoplastic resin in water in the presence of a minor amount of dispersing agent. If the dispersion is capable of forming a continuous film upon removal of the aqueous phase by evaporation, it is more definitely termed a latex. The above dispersions or latices can be utilized in coating metal or paper, in polish formulations, in paint formulations, for textile sizing and waterproofing, for coating fibers, etc.

In the case of dispersions which are not latices, the temperature of the dispersion may be lowered to below about 100° C., and the polymer separated from the aqueous phase in the form of discrete particles by filtration, evaporation of the water, and the like. It is an outstanding feature of this invention that the finely-divided polymer recovered after several washings with water contains comparatively little residual dispersing agent and, consequently, requires no subsequent treatment where the presence of such residues would be considered undesirable. The aqueous filtrate and washings contain substantially all of the dispersing agent originally added, in unchanged form, and thus may be recycled to act as the dispersion medium for subsequent batches of polymer.

Drying of the recovered finely-divided polymer yields a free-flowing powder of fine particle size and narrow particle size distribution. Generally, all of the dispersed particles have diameters less than about 500 microns. By varying the composition of the subject novel dispersing agents and the ratio of polymer to water, average particle size ranging from about 300 microns to as low as about 10 microns or below can be obtained. Especially preferred are particles of narrow size distribution wherein the number of average particle size is less than about 150 microns, and more desirably less than about 50 microns, but not less than about 10 microns.

The finely-divided polymers of this invention are superior in powder form for static or fluidized dip coating, spraying, dusting, and flame spraying applications as well as for preparing stable dispersions in water or some other medium for use in roller, dip, or spray coating. The relatively high molecular weight polymers of this invention also find use in the preparation of heat resistant coatings, in the preparation of molded or formed shapes by powder or slush molding techniques, and in the preparation of foams in combination with conventional blowing agents.

Latices can be prepared within the framework of this invention through the use of a combination of selected polymers or copolymers and particular dispersing conditions. Included among the polymers and copolymers suitable for dispersion to latices are low density polyethylenes having a melt flow rate above about 3000, and particularly between about 4000 and 10,000. Also included are copolymers of ethylene and vinyl acetate wherein the ethylene constitutes at least 75 percent by weight of the final copolymer, and wherein the copolymers exhibit melt flow rates of at least 15, and preferably between about 25 and 7,000. Dispersion temperatures suitable for producing the above latices are generally above about 160° C., and preferably range from about 175° to 225° C.

The resultant latices by definition deposit continuous films when the aqueous medium is permitted to evaporate under uniform and mild conditions, such as in air at ambient temperature and atmospheric pressure. This property imparts important and useful value to the latices which can be used for applying continuous film coatings at ambient temperature to substrates such as paper, paperboard, metal foil, glass, plastic film or sheet, and the like, and for waterproofing fibers and textiles.

The following examples will further illustrate this invention without limitation. All parts are by weight unless otherwise indicated.

The materials employed in these examples are as follows:

| COMPONENT | DESCRIPTION |
|---|---|
| Petrothene 202 | U.S. Industrial Chemicals Co. polyethylene of melt index (ASTM D1238-65T Condition E): 22.0 g/10 min.; density: .915 g/cc |
| Petrothene LS-630 | U.S. Industrial Chemicals Co. polyethylene of melt index (ASTM D1238-65T Condition E): 28.0 g/10 min.; density: .962 g/cc |
| Deriphat 151 | Sodium salt of N-coco 3-aminopropionic acid (General Mills Chemicals Inc.), 100% active |
| Deriphat 154 | Disodium salt of N-tallow 3-iminopropionic acid (General Mills Chemicals Inc.), 100% active |
| Deriphat 160 | Disodium salt of N-lauryl 3-iminodipropionic acid of 100% concentration from General Mills Chemicals Inc. |
| Mafo 13 | Potassium salt of complex N-stearyl amino dicarboxylic acid (Mazer Chemicals), 70% active |
| Mafo 213 | Dipotassium salt of complex N-stearyl amino dicarboxylic acid (Mazer Chemicals), 70% active |

The dispersion apparatus comprised a cylindrical one-liter, 4-inch diameter pressure reactor (Parr Instrument Company) equipped with a thermowell, a safety head, a stirrer bearing and shaft, and a pressure gage. Power was supplied to the stirrer by means of a fractional horse-power motor. The stirring propeller comprised two curved tooth turbine-type discs (3-inch diameter).

The resin powders of the examples were analyzed by one of two procedures. In accordance with one procedure, the powders were sieved by means of appropriate ASTM screens. The results of the sieving analyses are expressed in weight percent. The other analytical procedure involved the use of an electronic Coulter counter and was particularly useful where a more precise count was desired and with dispersions such as latices where sieving and microscopic counts were impractical. The Coulter counter determines the number and volume of particles suspended in an electrically conductive liquid as these particles flow singularly through a small aperture having an immersed electrode on each side. As a particle passes through the aperture, it displaces electrolyte within the aperture and thereby momentarily changes the resistance between the electrodes, causing a voltage pulse of magnitude proportional to the volume of the particle. The pulses for the particles of the sample are electrically amplified, scaled, and counted. From these counts, generally made on several million particles, accurate distribution curves of both number and weight percent can be established. Results are expressed in terms of the largest and smallest particles counted, the 25, 50 and 75 weight percentile size, and the number average particle size.

EXAMPLE 1

150 Parts of a polyethylene having a density of 0.915 g/cc and a melt index (ASTM D1238-65T Condition E) of 22.0 g/10 min., in the form of pellets, the selected amino acid dispersant, and 450 ml. deionized water were charged to the reactor. Heat was applied until the temperature of the mixture reached 200° C. at a pressure of 235 psi. Stirring was then started at a rate of 3700 rpm and continued during the cooling period which started immediately after the temperature had reached 200° C. and lasted about 15 minutes until the temperature had dropped below 100° C. The residual pressure was then bled off, the obtained dispersion was suction-filtered on a Buchner funnel fitted with a #541 Whitman filter paper. The residue was washed thoroughly with water and dried for 4 hours at 60° C.

The results obtained with various dispersants are given in Table I.

TABLE I

| DISPERSING AGENT | | | | PRODUCT Sieve Analysis of Particles with a Diameter Below 500 Microns, in Wt. Percent | | | | | | |
|---|---|---|---|---|---|---|---|---|---|---|
| NAME | TYPE | AMT. g | YIELD % | BELOW 37 MICRONS | 37-53 MICRONS | 53-106 MICRONS | 106-149 MI-CRONS | 149-250 MI-CRONS | 250-420 MICRONS | LARGER THAN 420 MICRONS |
| Deriphat 151 | Amphoteric | 15.0 | 100 | Fine dispersion; | | not analyzed | | | | |
| Deriphat 154 | Amphoteric | 15.0 | 100 | | 16.6 | 20.6 | 17.8 | 37.8 | 3.7 | 3.5 |
| Mafo 13 | Amphoteric | 21.5 | 100 | Fine dispersion; | | not analyzed | | | | |
| Mafo 213 | Amphoteric | 21.5 | 100 | Fine dispersion; | | not analyzed | | | | |

EXAMPLE 2

Polyethylene of 0.915 g/cc density having a melt index (ASTM Condition E) of 22.0 g/10 min. was dispersed in a series of experiments according to the technique described in EXAMPLE 1. The surfactant used was Deriphat 154, the amphoteric disodium salt of N-tallow 3-iminodipropionic acid. Varying amounts of sodium hydroxide were added to the mixture before heating and dispersion in order to vary the resulting particle size distribution. The amounts of sodium hydroxide as well as the particle size distributions are listed in TABLE II.

TABLE II

| Charge: | 450 ml water |
| | 15 g Deriphat 154 |
| | 150 g polyethylene |
| | Sodium hydroxide as indicated |
| Temp: | 200° C. |

Sieve Analysis of Particles with a Diameter Below 500 Microns, in Wt. %

| NaOH g | Below 53 Mi-crons | 53-106 Mi-crons | 106-149 Microns | 149-250 Microns | 250-420 Microns | Larger Than 420 Mi-crons |
|---|---|---|---|---|---|---|
| — | 16.6 | 20.6 | 17.8 | 37.8 | 3.7 | 3.5 |
| 1 | 19.3 | 37.9 | 21.6 | 19.3 | 1.4 | 0.4 |
| 2 | 14.3 | 26.9 | 21.1 | 35.5 | 1.6 | 0.5 |
| 4 | 5.4 | 31.4 | 14.2 | 42.7 | 4.7 | 1.5 |

What is claimed is:

1. A process for preparing in finely divided form a polyolefin resin which comprises:
    (a) agitating a mixture of the resin while in the molten state, a dispersion-forming amount of water, and a dispersion-forming amount of an alkali metal salt of an amino acid dispersing agent, to provide a hot aqueous dispersion of the resin; and,
    (b) cooling the dispersion to provide solid particles of resin.

2. The process of claim 1 wherein solid particles of resin produced in step (b) are recovered from the aqueous dispersion.

3. The process of claim 1 wherein the resin comprises a polyolefin.

4. The process of claim 3 wherein the resin comprises polyethylene or polypropylene.

5. The process of claim 1 wherein the alkali metal salt is a sodium salt.

6. The process of claim 1 wherein the resin comprises ethylene-vinyl acetate containing up to 25% by weight of vinyl acetate.

7. A process for preparing in finely divided form a polyolefin resin which comprises:
    (a) agitating a mixture of the resin while in the molten state, a dispersion-forming amount of water, a base and a dispersion-forming amount of an alkali metal salt of an amino acid dispersing agent in the presence of a base to regulate the particle size distribution of the dispersed resin; and,
    (b) cooling the dispersion to provide solid particles of resin of controlled particle size distribution.

8. The process of claim 7 wherein solid particles of resin produced in step (b) are recovered from the aqueous dispersion.

9. The process of claim 7 wherein the resin comprises a polyolefin.

10. The process of claim 7 wherein the resin comprises polyethylene or polypropylene.

11. The process of claim 7 wherein the resin comprises ethylene-vinyl acetate containing up to 25% by weight of vinyl acetate.

* * * * *